3,827,864
COMPOSITE EXTRUSION
Tomiyoshi Kanai and Shunta Ushioda, Tochigi, Japan, assignors to Showa Aluminium Kabushiki Kaisha, Osaka, Japan
Filed Feb. 22, 1972, Ser. No. 227,961
Claims priority, application Japan, Feb. 23, 1971, 46/8,798, 46/8,799, 46/8,800
Int. Cl. B21c 37/00
U.S. Cl. 29—191.6
12 Claims

ABSTRACT OF THE DISCLOSURE

A composite extrusion comprises a base metal member made of pure aluminum or aluminum alloy which assures a beautiful finish when treated by anoidic oxidation and an embedded metal member embedded in the base metal member and made of an aluminum alloy of good machinability. The embedded metal member is positioned in one part generally of the peripheral face of the base metal member to be machined and extends throughout the entire length of the base metal member.

BACKGROUND OF THE INVENTION

The present invention relates to composite extrusions to be used as a material for lens barrel of interchangeable lens of camera, lens barrel of telephoto lens, lens barrel of telescope and for various other applications.

In recent years, these lens barrels are produced by machining an aluminum extrusion to the desired shape. Naturally, the lens barrel has to be attractive in appearance if it is of any commercial value. Accordingly, pure aluminum or aluminum alloy is used for the extrusion which assures a beautiful finish when the resulting product is treated by anodic oxidation. Moreover the extrusion is subjected to machining prior to anodic oxidation treatment in order to render the material smooth-surfaced. However pure aluminum or aluminum alloy which ensures attractive finishing by anodic oxidation has poor machinability and gives a continuous helical chip when machined, with the result that the chip is removed as if by tearing off, leaving projecting traces of machining on the surface of the extrusion. This requires additional trouble for removal. It will therefore be desired to use an alloy of good machinability for the extrusion, but such alloy does not permit satisfactory formation of an anodic oxide coating. In other words, the anodic oxide coating obtained has a smaller thickness than is desired. The lens barrel is usually dyed in black and color and, if the coating is not thick enough, it is impossible to dye the barrel satisfactorily. For this reason, an extrusion made of an alloy of good machinability gives a lens barrel of lower commercial value, hence such alloy is not employable.

SUMMARY OF THE INVENTION

The object of this invention is to overcome the foregoing problems and to provide extrusions having good machinability and assuring a beautiful finish when treated by anodic oxidation.

According to this invention, there is provided a composite extrusion comprising a base metal member made of pure aluminum or aluminum alloy assuring a beautiful finish when treated by anodic oxidation and an embedded metal member embedded in the base metal member and made of an aluminum alloy having good machinability, the embedded metal member being positioned in at least one part generally of peripheral face of the base metal member to be machined and extending throughout the entire length thereof.

Commercially available pure aluminum which assures a beautiful finish when the resulting product is treated by anodic oxidation may preferably have purity of not lower than about 99.5%. Aluminum alloy which likewise permits a beautiful finish when treated by anodic oxidation includes 5056, 5052 and 6063 aluminum alloys. The numbers of the aluminum alloys used in this specification are Aluminum Association Standard Members. Preferable aluminum alloys having good machinability includes an aluminum alloy consisting of 1.8 to 2.2% copper, 0.8 to 1.2% of lead plus bismuth, the balance being aluminum and impurities, an aluminum alloy consisting of 0.4 to 0.9% silicon, 0.15 to 0.4% copper, 0.8 to 1.2% of lead plus bismuth, the balance being aluminum and impurities, and an aluminum alloy which principally comprises the latter aluminum alloy with further addition of 0.8 to 1.0% of tin and cadmium to improve machinability. Another example of aluminum alloy having good machinability is 2011 aluminum alloy.

The embedded metal member is obtained by extrusion. It is preferable to coat the embedded metal with pure aluminum when it is extruded, because pure aluminum is more corrosion-resistant than the above-mentioned aluminum alloy of good machinability and therefore assures advantageous storage of the extrusion. Further depending upon the composition of the base metal alloy and that of the alloy to be embedded therein, there occurs a combination which results in poor joinability between the base metal member and the embedded metal member, an example of which is the combination of 5056 aluminum alloy serving as base metal member and 2011 aluminum alloy as embedded metal member. In the case where the embedded metal member made of 2011 aluminum alloy is coated with pure aluminum, the pure aluminum which is amenable to 5056 aluminum will give a strong joint between the base metal member and embedded metal member.

The extrusion of this invention can be obtained by extruding a composite billet. Methods for producing composite billet will now be described briefly. A first method comprises the steps of forming an elongated embedded metal member for a billet, placing the embedded metal member at a predetermined position within a mold, pouring a molten metal for enclosing the embedded metal member into the mold around the embedded metal member and cooling the metal. A second method comprises the steps of forming a base metal member for billet by casting, boring an elongated hole through the base metal member in conformity with the shape of an embedded metal member for billet, pouring a molten metal into the hole and cooling the metal.

To machine the extrusion, the extrusion is usually driven and cut with a stationary cutting tool. In accordance with this invention, the cutting tool comes to the position of the aluminum alloy having good machinability every time the extrusion rotates one turn, so that the chip is cut off every time the cutting tool reaches this position. Thus the chip will not be forced off unlike conventional practice, but a smooth face will be obtained without necessity to remove the remaining chips, hence an efficient machining operation. Further since a beautiful finish is achieved over the majority of the extrusion surface by anodic oxidation, the attractive appearance will not be impaired.

This invention will be described in greater detail with reference to the accompanying drawings.

DESCRIPTION OF THE PREFERRED EMBODIMENTS

Figure 1:
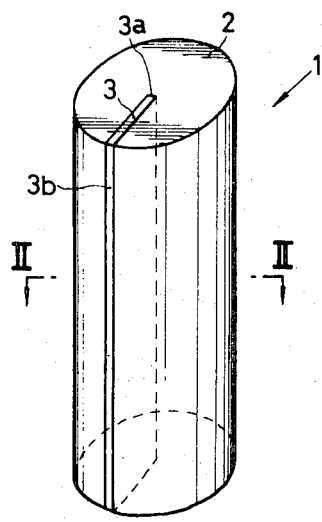
FIG. 1 is a perspective view showing a composite extrusion according to the present invention.
Figure 2:
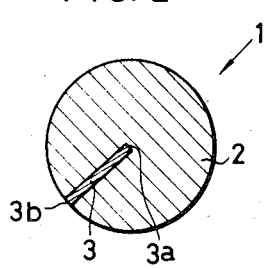
FIG. 2 is a view in section taken along the line II—II in FIG. 1.

Referring to FIGS. 1 and 2, a composite extrusion 1 includes a cylindrical base metal member 2 and an embedded metal member 3 embedded therein and extending throughout the entire length of the base metal in its longitudinal direction. The embedded metal member 3 has an inner edge 3a positioned at the center of the base metal member 2 and an outer edge 3b so disposed as to be exposed at the peripheral face of the base metal member 2. The base metal member 2 consists of 0.15% manganese, 0.1% chromium, 5% magnesium, the balance being aluminum and impurities. The embedded metal member 3 consists of 2% copper, 1% lead plus bismuth, the balance being aluminum and impurities. The embedded metal member 3 is not necessarily limited to a platelike shape but may be extruded into any desired cross-sectional shape. However, a metal member in the form of plate can satisfactorily serve the purpose. Preferably, the embedded metal member has a thickness of 0.8 mm. to 8 mm. With a thickness of smaller than 0.8 mm., the embedded metal member 3 is too thin to permit the chip to be cut off at the portion of the embedded member 3 during machining, whereas if it is in excess of 8 mm., a poor finish will show up at the portion where the embedded metal member 3 is exposed when treated by anodic oxidation. Thicknesses of more than 8 mm. are not necessary for the chip to be cut off.

The composite extrusion 1 is formed into a lens barrel for interchangeable lens of the camera. The extrusion 1 has cylindrical base metal member 2 and platelike embedded metal member 3 which extends, in cross section, from the center of the base metal member 2 up to the outer periphery thereof. Thus when the inner circumferential face of a bore formed in the extrusion 1 by a boring machine is cut by a lathe in a predetermined manner, the cutting tool encounters the embedded metal member 3 every time the extrusion 1 rotates one turn, interrupting the continuity of the resulting chip. In the case where the outer peripheral face of the extrusion 1 is cut by a lathe, the cutting tool likewise encounters the embedded metal member 3 every time the extrusion 1 rotates one turn, permitting the chip to be cut off without being forced to be torn off. As a result, the extrusion 1 is rendered smooth-surfaced at its inner and outer circumferential faces, free of any cutting remnant. The desired lens barrel thus obtained is then provided with an anodic oxide coating in usual manner. Since the surface of the lens barrel is provided by the base metal member 2 with an exception of a very small portion of the exposed embedded metal member 3 and the base metal member 2 has the foregoing alloy composition, the barrel can be treated by anodic oxidation and subsequently dyed in a beautiful color to give a finished lens barrel having an attractive appearance.

Figure 3:
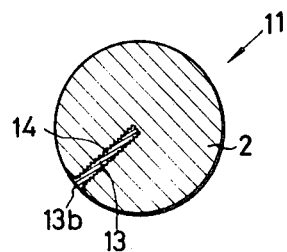

FIG. 3 shows a modified composite extrusion which incorporates an embedded metal member having a characteristic shape in its surface. This modification is similar to the foregoing embodiment in that the composite extrusion II includes a cylindrical base metal member 2 and a platelike embedded metal member 13. However, the embedded metal member 13 has a special shape in its surface. More specifically, the embedded metal member 13 is formed in its entire surface with a great number of projections 14 having a substantially triangular cross section and extending in a longitudinal direction. The projections 14 increase the surface area of the embedded metal member 13 and assure more reliable joining of the embedded metal member 13 with the base metal member 2. Moreover, the outer edge 13b of the embedded metal member 13 flares outward in cross section. This is particularly significant in the step of producing a composite billet from which the extrusion is made. In the case where a great amount of metal has to be cut off the outer peripheral surface of the extrusion, the embedded metal member need not always be exposed at the face of the base metal member but may be positioned slightly inward from its outer peripheral face, with its outer edge covered with the base metal member. Naturally, however, greater cutting efficiency will be achieved if the embedded member is exposed from the surface of the base metal member. In the case where a composite billet is produced by the already described first method which billet is to be made into the extrusion 1 shown in FIGS. 1 and 2, molten metal has to be poured into a mold, with the outer edge of the embedded metal member for the billet positioned in contact with the inner face of the mold. When the molten metal is solidified by cooling with water, there arises the possibility of small gaps being created between the base metal member and the opposite side faces of outer edge of embedded member of the billet. Extrusion of the billet in such state will then result in somewhat incomplete joining of the embedded member with the base metal member. In order to eliminate the above-mentioned gaps, the outer edge of the embedded metal member for billet is formed beforehand in a flaring cross-sectional shape. FIG. 3 shows an extrusion obtained from a composite billet incorporating such embedded metal member for billet.

Figure 4:
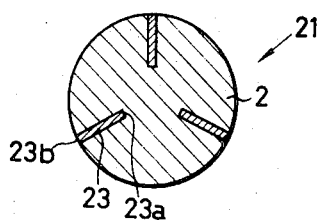
FIGS. 3 to 7 are sectional views corresponding to FIG. 2 and respectively illustrating various modifications of the composite extrusion of this invention.

FIG. 4 shows a modified composite extrusion including a different number of embedded metal members.

FIG. 4 shows a modified composite extrusion including a different number of embedded metal members. The composite extrusion 21 comprises a cylindrical base metal member 2 the same as in the foregoing embodiments which incorporates three platelike embedded metal members 23 in radial arrangement. The inner edges 23a of the embedded members 23 are slightly away from the center of the base metal member 2 and the outer edges 23b thereof are exposed from the outer peripheral surface of the base metal member 2.

When the extrusion 21 is cut by a lathe in its inner and outer circumferential faces, the cutting tool encounters the embedded metal member 23 three times during every turn of rotation of the extrusion.

Although the base metal member of this embodiment includes three embedded members, the number of the embedded members and the distance therebetween can be determined as desired.

Since the extrusions 11 and 21 shown in FIGS. 3 and 4 are solid like the extrusion 1 shown in FIGS. 1 and 2, they are suitable as a material for the lens barrel of interchangeable lens for camera having a short length.

Figure 5:
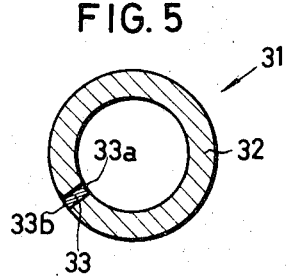

FIG. 5 shows a modification of the composite extrusion comprising a different base metal member. The composite extrusion 31 includes a tubular base metal member 32 and a platelike embedded metal member 33, the inner edge 33a and outer edge 33b of the embedded member 33 being exposed from the inner and outer circumferential surfaces of the base metal member 33 respectively.

The extrusion 31 which is hollow from the start and does not require drilling is suited as a material for the elongated lens barrel of telescope. The number of the embedded member in this embodiment can further be increased.

Figure 6:
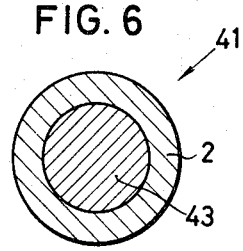

FIG. 6 shows a modified embodiment of composite extrusion including an embedded metal member which is entirely distinct from those of the embodiments already described. The composite extrusion 41 includes a base metal member 2 and an embedded metal member 43 which are both cylindrical, the embedded metal member 43 being embedded in the base metal member 2 concentrically therewith.

With the provision of the embedded metal member 43 extending longitudinally of the extrusion 41 at its center and made of an aluminum alloy of good machinability, the extrusion 41 ensures efficient and easy drilling and boring operations. For example, a threaded hole can be readily formed therein. In addition, the outer peripheral face of the extrusion 41 can be provided with a beautiful finish when treated by anodic oxidation. Since the extrusion 41 does not include the embedded metal member in its outer peripheral surface, it is made into a product such as a post or leg of machines and instruments to which smoothness of surface is not essential.

Figure 7:
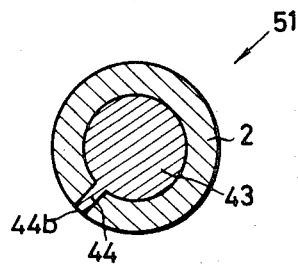

FIG. 7 shows a modification of the composite extrusion shown in FIG. 6. With this composite extrusion 51, the embedded metal member 43 of the above-mentioned extrusion 41 is provided in its peripheral face with a fin 44 which extends in its longitudinal direction. The outer edge 44b of the fin 44 is exposed from the outer peripheral face of the base metal material 2.

The extrusion 51 permits efficient drilling and boring operations and, with the provision of the fin 44 of the embedded member 43 located in the outer peripheral face of the extrusion 51, the peripheral face can be machined to obtain a smooth surface free of cutting traces as in the case of the extrusions shown in FIGS. 1 to 5. Moreover, anodic oxidation treatment will give a beautiful finish. The extrusion is suitable, for instance, for the posts or legs of furniture or the like. The embedded metal member 43 can of course be provided with a plurality of fins 44.

Figure 8:
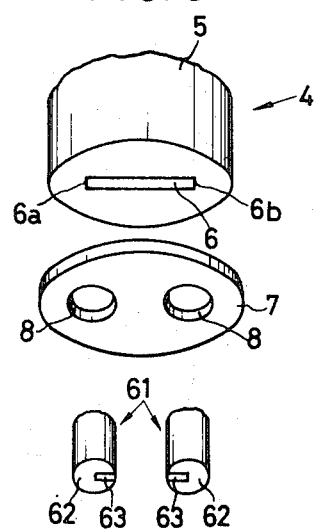
FIG. 8 is a perspective view schematically showing a mode of producing two composite extrusions of a smaller diameter from one composite billet.

FIG. 8 shows how two composite extrusions are made from one composite billet. A composite billet 4 comprises a cylindrical base metal 5 and an embedded platelike metal member 6 extending throughout the whole length of the base member. The embedded metal member 6 passes through the center of the base metal member 5 with its opposite edges 6a and 6b positioned approximately at the midportion of radius of the base metal member 5. A die 7 is formed with two circular die openings 8 respectively centered about the corresponding positions of the opposite edges 6a and 6b of the embedded metal member 6. Accordingly, when extruded through the die 7, the composite billet 4 is formed into two composite extrusions 61 at the same time. The extrusion 61 is substantially identical to the composite extrusion 1 shown in FIGS. 1 and 2 in that it comprises a cylindrical base metal member 62 and a platelike embedded metal members 63 which extends in cross section from the center of the base metal member 62 up to the outer peripheral face thereof. Such method of extrusion is advantageous from the viewpoint of extrusion efficiency when there is a need to produce extrusions of a small diameter.

The alloy compositions of base metal member and embedded metal member of the composite extrusions shown in FIGS. 3 to 8 are the same as those of the composite extrusion illustrated in FIGS. 1 and 2.

We claim:

1. A composite extrusion to be machined by a cutting tool comprising a base metal member made of pure aluminum or aluminum alloy assuring a beautiful finish when treated by anodic oxidation and an embedded metal member embedded in the base metal member and made of an aluminum alloy having good machinability, the base metal member having a peripheral surface to be machined, the embedded metal member extending to and being exposed at and flush with said peripheral surface of the base member along the entire length of the peripheral surface whereby a cutting tool contacts the embedded metal member during relative rotation of the cutting tool and the extrusion at least once during each rotation so that the chip formed by the cutting tool is cut off when the cutting tool contacts the embedded metal member.

2. The composite extrusion of claim 1 in which the embedded metal member extetnds substantially straight along the length of the peripheral surface.

3. The composite extrusion of claim 1 wherein the peripheral surface of the base metal member to be machined is the outer surface of the base metal member.

4. The composite extrusion of claim 1 wherein the base metal member is tubular and includes an inner peripheral surface, the peripheral surface of the base metal member to be machined being the inner surface of the base metal member.

5. The composite extrusion of claim 1 wherein the embedded metal member includes a plurality of outwardly extending projections.

6. The composite extrusion of claim 1 wherein the embedded metal member adjacent said peripheral surface is flared laterally outwardly in cross section.

7. The composite extrusion of claim 1 wherein the base metal member is cylindrical and the embedded metal member is platelike, the embedded metal member extending generally from the center of the base metal member to the outer peripheral surface thereof.

8. The composite extrusion of claim 1 wherein the base metal member is cylindrical and the embedded metal member is platelike, the embedded metal member extending generally from the center of the base metal member in a radial direction.

9. The composite extrusion of claim 1 wherein the base metal member is tubular and has inner and outer peripheral surfaces and the embedded metal member is platelike, the embedded metal member extending generally from the inner peripheral surface of the base metal member to the outer peripheral surface thereof.

10. The composite extrusion of claim 1 wherein both the base metal member and the embedded metal member are cylindrical and the embedded metal member is embedded within the base metal member concentrically therewith, the embedded metal member being formed on its outer peripheral surface with at least one longitudinally extending fin.

11. The composite extrusion of claim 1 wherein the embedded metal member is aluminum alloy containing 0.8 to 1.2% by weight in total of lead plus bismuth.

12. The composite extrusion of claim 1 wherein the surface of the embedded metal member is coated with pure aluminum.

References Cited
UNITED STATES PATENTS

| | | | |
|---|---|---|---|
| 867,659 | 10/1907 | Hoopes et al. | 29—191.6 |
| 2,207,090 | 7/1940 | Edwards | 29—191.6 |
| 3,372,007 | 3/1968 | Shaver | 29—183 |

WINSTON A. DOUGLAS, Primary Examiner

O. F. CRUTCHFIELD, Assistant Examiner